United States Patent
Walkingshaw

(10) Patent No.: US 9,740,725 B2
(45) Date of Patent: Aug. 22, 2017

(54) RECOMMENDING CONTENT TO DIGITAL MAGAZINE SERVER USERS BASED ON CONTENT INCLUSION IN DIGITAL MAGAZINES

(71) Applicant: Flipboard, Inc., Palo Alto, CA (US)

(72) Inventor: Andrew David Walkingshaw, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 349 days.

(21) Appl. No.: 14/569,540

(22) Filed: Dec. 12, 2014

(65) Prior Publication Data

US 2015/0248406 A1    Sep. 3, 2015

Related U.S. Application Data

(60) Provisional application No. 61/946,491, filed on Feb. 28, 2014.

(51) Int. Cl.
*G06F 17/00* (2006.01)
*G06F 17/30* (2006.01)
*G06Q 30/02* (2012.01)

(52) U.S. Cl.
CPC .... *G06F 17/30342* (2013.01); *G06F 17/3089* (2013.01); *G06Q 30/0204* (2013.01)

(58) Field of Classification Search
CPC ............ G06F 17/30867; G06F 17/212; G06F 17/2247; G06F 17/248; G06F 17/3053; G06F 17/30598
See application file for complete search history.

(56) References Cited

U.S. PATENT DOCUMENTS

| | | |
|---|---|---|
| 6,839,879 B1 | 1/2005 | Hwang |
| 2008/0120670 A1 | 5/2008 | Easton et al. |
| 2010/0076811 A1 | 3/2010 | Keller et al. |
| 2011/0099071 A1 | 4/2011 | Johnson |
| 2012/0096013 A1 | 4/2012 | Ciancutti et al. |
| 2012/0297490 A1 | 11/2012 | Barraclough et al. |
| 2013/0024757 A1 | 1/2013 | Doll et al. |
| 2013/0191394 A1 | 7/2013 | Bradley et al. |
| 2014/0074863 A1 | 3/2014 | Walkingshaw et al. |
| 2014/0074934 A1* | 3/2014 | van Hoff ............. G06F 17/3053 709/204 |
| 2014/0236956 A1 | 8/2014 | Matsuura et al. |

OTHER PUBLICATIONS

PCT International Search Report and Written Opinion for PCT/US2015/016700, Jun. 8, 2015, 12 Pages.

* cited by examiner

*Primary Examiner* — Truong Vo
(74) *Attorney, Agent, or Firm* — Fenwick & West LLP

(57) ABSTRACT

A digital magazine server allows its users to create digital magazines by including content items in sections of one or more digital magazines. For various pairs of digital magazines, the digital magazine server determines a score based on a number of content items added to a digital magazine that were previously added to an additional digital magazine in a pair. The score indicates a frequency that the additional digital magazine added content items before the digital magazine. Digital magazines may be ranked for a user based on the scores, with the ranking used to recommend digital magazines or other users to the user. Further, the scores and connections between digital magazines may be used to create an influence score for various digital magazines.

20 Claims, 6 Drawing Sheets

RECOMMENDING CONTENT TO DIGITAL MAGAZINE SERVER USERS BASED ON CONTENT INCLUSION IN DIGITAL MAGAZINES

CROSS REFERENCE TO RELATED APPLICATIONS

This application claims the benefit of U.S. Provisional Application No. 61/946,491, filed Feb. 28, 2014, which is incorporated by reference in its entirety.

BACKGROUND

This invention relates generally to digital magazines, and more specifically to recommending content to a digital magazine server user based on content inclusion in various digital magazines maintained by the digital magazine server.

A digital magazine identifies content items for presentation to users and the content items can be identified based on user-defined preferences or parameters. These content items are presented to users via devices such as mobile devices, tablet computers, laptop computers, or desktop computers. As a user interacts with content items presented in a digital magazine, additional content items may be identified for presentation to the user based on the interactions. For example, the additional content items are selected based on their similarity to content items with which the user previously interacted. However, because conventional methods for identifying content items for recommendation to a user are based on user interactions with content items, they rely on limited information to identify content items for recommendation to the user.

SUMMARY

A digital magazine server stores information describing various digital magazines. Each digital magazine is associated with one or more content items and one or more users authorized to associate content items with the digital magazine. Additionally, each content item associated with a digital magazine is associated with a timestamp indicating a time when the content item was associated with the digital magazine as well as information for retrieving the content item from a source (e.g., a network address). Based on a time when a content item was associated with various digital magazines, the digital magazine server may recommend content items for association with a digital magazine.

A digital magazine associated with a user is identified by the digital magazine server along with one or more additional digital magazines associated with additional users of the digital magazine server. For example, the user and the digital magazine are identified when the user associates a content item with the digital magazine. In one embodiment, the digital magazine server identifies a digital magazine associated with a user and additional digital magazines associated with additional users that include at least one content item also included in the digital magazine but were associated with the additional digital magazine at a time before the content item was associated with the digital magazine. Alternatively, the digital magazine server identifies a digital magazine associated with a user and additional digital magazines associated with additional users that include at least one content item also included in the digital magazine but were associated with the additional digital magazine at a time after the content item was associated with the digital magazine.

The digital magazine server generates a score for each additional digital magazine. A score associated with an additional digital magazine is based at least in part on a number of content items associated with the additional digital magazine before the same content items were associated with the digital magazine. In various embodiments, additional digital magazines are ranked based at least in part on their scores. Based on the ranking, the digital magazine server selects one or more of the additional digital magazines and presents information describing the selected additional digital magazines to the user. For example, a suggestion identifying a title of an additional digital magazine and a user authorized to associate content items with an additional digital magazine is presented if the additional digital magazine has at least a threshold position in the ranking.

Alternatively, the digital magazine server determines a score for an additional digital magazine based on a number of times content items were associated with the additional digital magazine after the same content items were associated with the digital magazine. Based on scores associated with various additional digital magazines associated with an additional user, the digital magazine server may determine a score. The digital magazine server may identify content for presentation to the additional user based at least in part on the determined score associated with the additional user. For example, the digital magazine server may infer that a selected additional digital magazine is influenced by the content items the user associates with the digital magazine, allowing the digital magazine server to leverage the user's association of content items with the digital magazine to provide additional content items (including advertisements) to the selected additional digital magazine.

Additionally, the digital magazine server may determine influence of a digital magazine on association of content items with additional digital magazines. For example, the digital magazine server identifies a target digital magazine and an additional digital magazine. A score for the target digital magazine is determined based on a number of content items associated with the target digital magazine that are also associated with the additional digital magazine at a time after they were associated with the target digital magazine. The digital magazine server stores a connection between the target digital magazine and the additional digital magazine that includes the score. Additional scores for the target digital magazine are determined based on various additional digital magazines, with the scores scored as connections between the target digital magazine and each additional digital magazine.

Based on the scores determined based on various additional digital magazines, an influence score is determined for the target digital magazine. In one embodiment, the influence score of the target digital magazine is based on influence scores of each digital magazine connected to the target digital magazine and the number of digital magazines connected to each digital magazine connected to the target digital magazine. Influence scores associated with a digital magazine may be used by the digital magazine server to select or to recommend content items, advertisements, applications, or other data for association with a digital magazine.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

However, a digital magazine may describe any group of content items associated with a user and also associated with a timestamp. The timestamp associated with a content item specifies a time when the content item was associated with the digital magazine. Examples of a digital magazine include a feed of content items for presentation to a user, a selection of items made by a user (e.g., a shopping cart a user generates from an online retailer, a selection of desired items specified by a user), a selection of content items or items for presentation or a user, or other groups of content items associated with one or more users.

System Architecture

Figure 1:
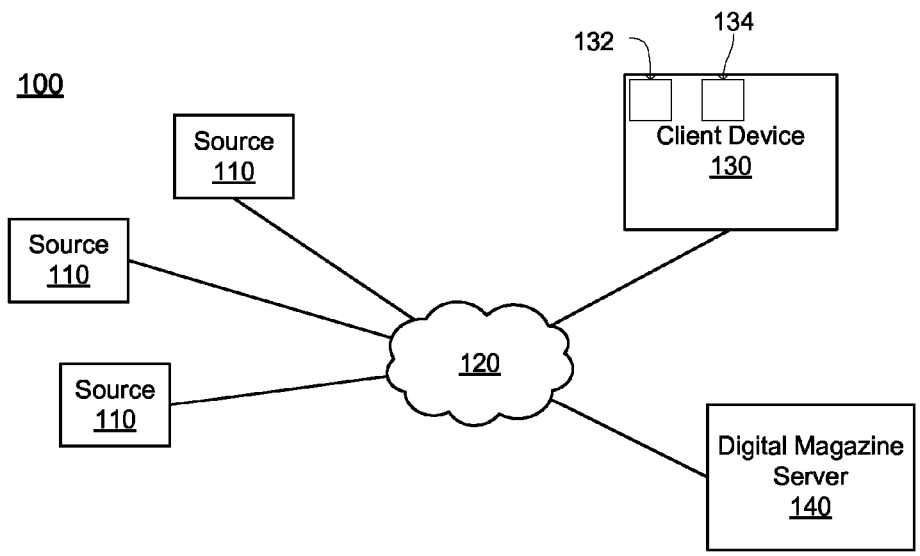
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
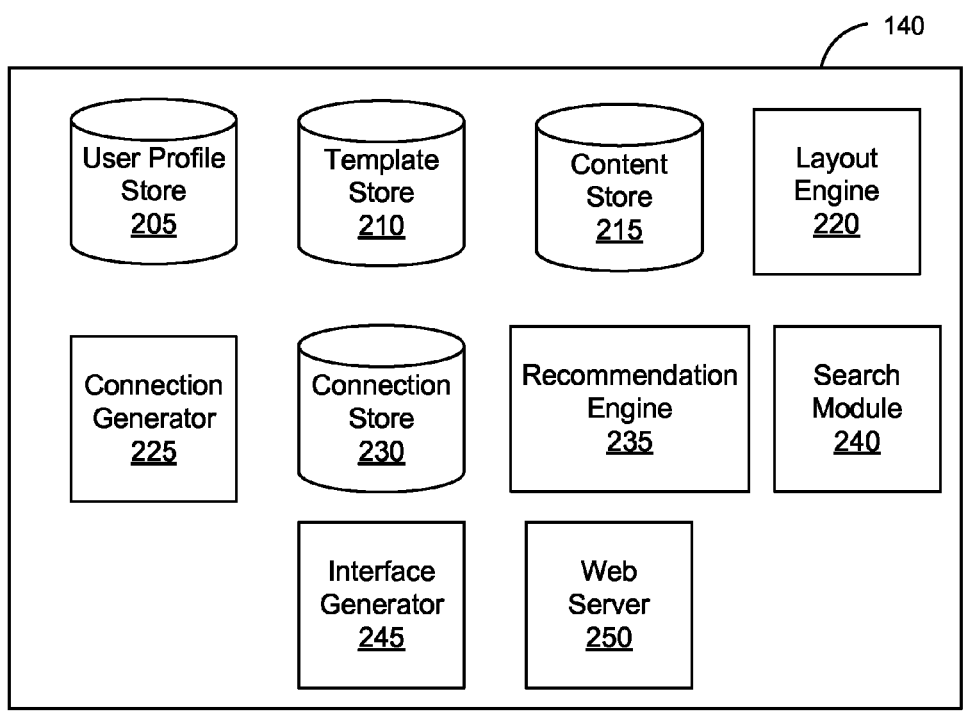
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

As further described below in conjunction with FIGS. 4 and 6, the recommendation engine 235 may account for content items included in multiple digital magazines associated with different users to recommend content items to a user. For example, the recommendation engine 235 identifies a content item associated with a digital magazine and also associated with an additional digital magazine at a different time than it was associated with the digital magazine. In one embodiment, the recommendation engine 235 determines a score for the additional digital magazine based on a number of content items associated with the additional digital magazine and also associated with the digital magazine after being associated with the additional digital magazine. Based on the score, the recommendation engine 235 may present information describing the additional digital magazine to a user associated with the digital magazine. Alternatively, the recommendation engine determines a score for the additional digital magazine based on a number of content items associated with the additional digital magazine after being associated with the digital magazine. Based on the score, the recommendation engine 235 may select content for subsequent inclusion in the additional digital magazine based on characteristics of the digital magazine or of the user associated with the digital magazine. Additionally, as further described below in conjunction with FIG. 6, the recommendation engine 235 may determine and store influence scores associated with various digital magazines indicating an amount of influence a digital magazine has over content included in an additional digital magazine.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. In one embodiment, an application executing on the client device 130 and associated with the digital magazine server 140 recommends digital magazines or other content to a user by analyzing content items included in different digital magazines as further described below in conjunction with FIGS. 4 and 6. Alternatively, an application executing on the client device 130 and the recommendation engine 235 exchange information to recommend digital magazines or other content items to a user of the client device 130. In additional embodiments, the recommendation engine 235 analyzes digital magazines maintained by the digital magazine server 140 and communicates information identifying digital magazines or content items for recommendation to the client device 130 for presentation to a user.

Page Templates

Figure 3:
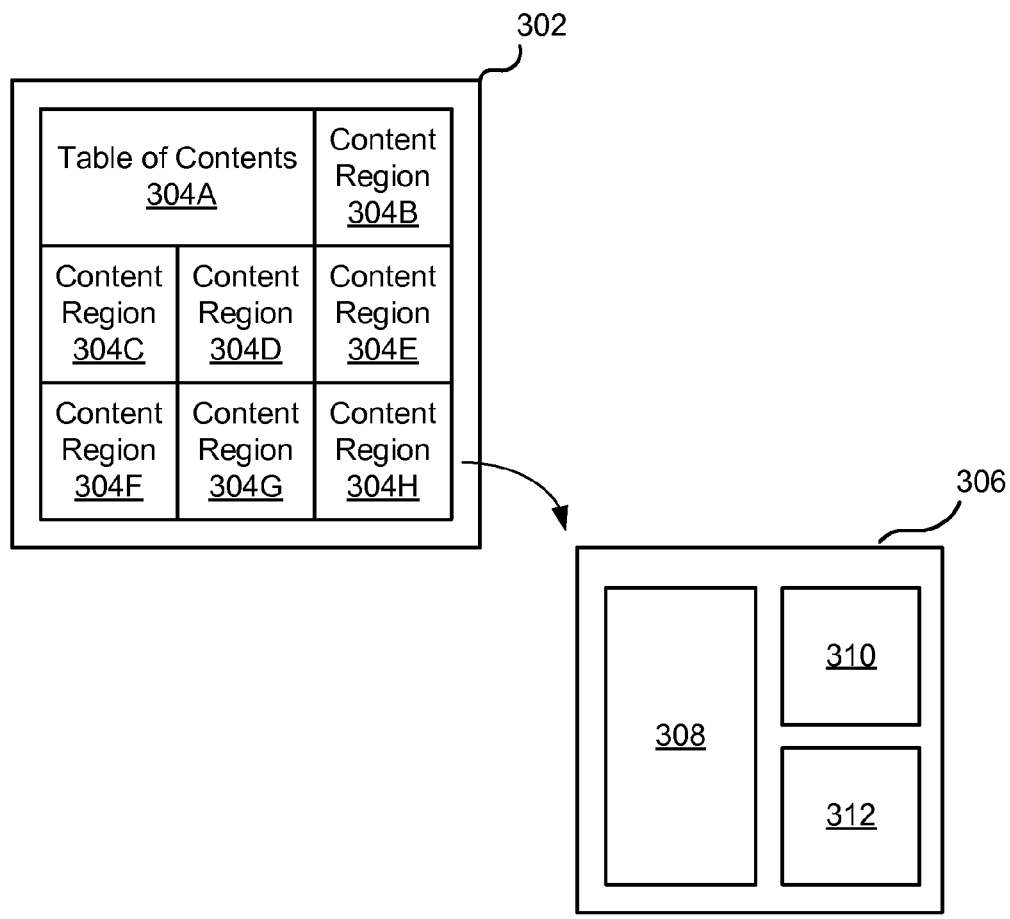
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
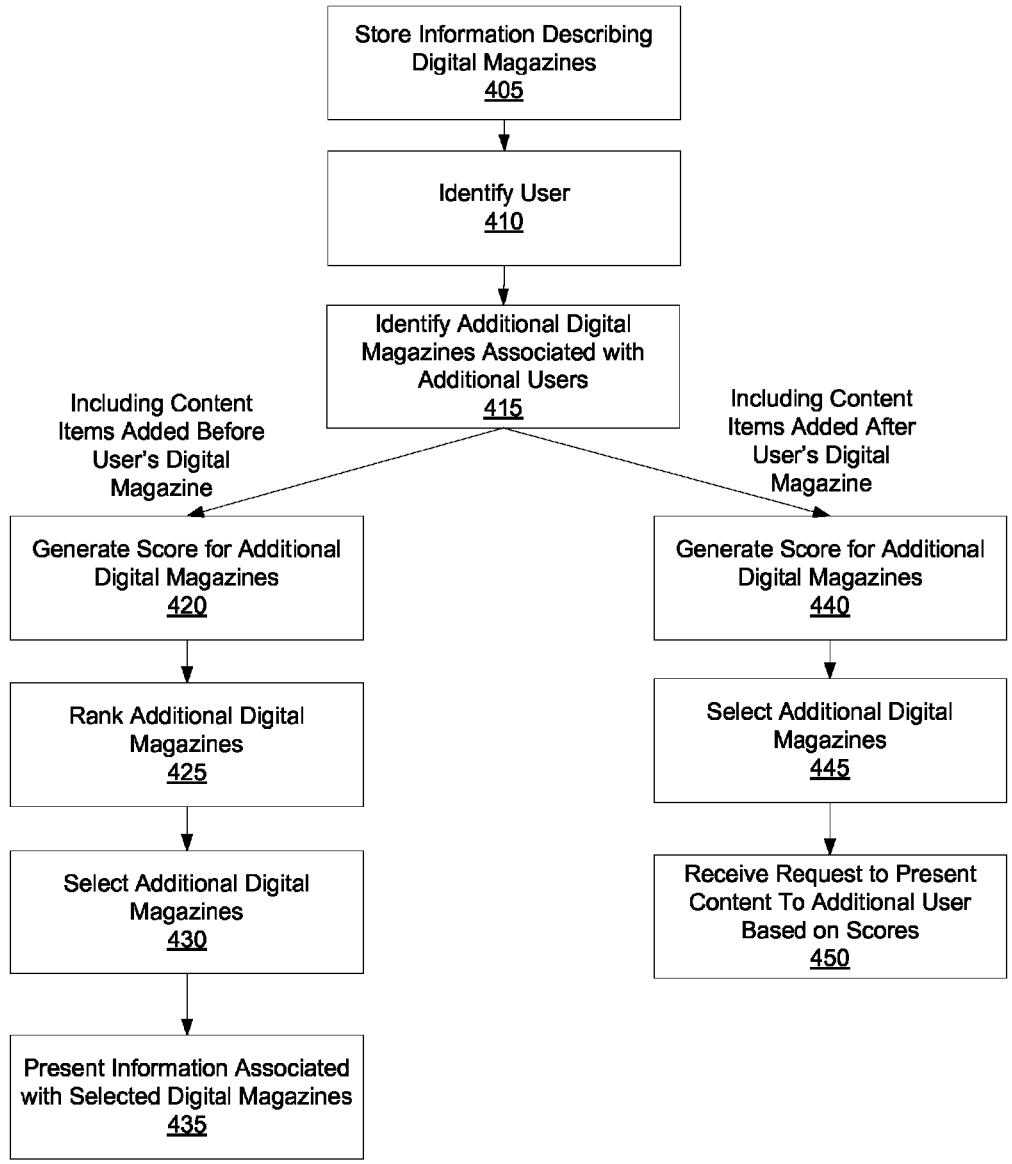
FIG. 4 is a flowchart of a method for identifying content for presentation to a user of a digital magazine server, in accordance with an embodiment of the invention.

Recommending Content Items Based on Content Item Inclusion in a Collection of Content FIG. 4 is a flowchart of one embodiment of a method for recommending content to a user of a digital magazine server 140. In other embodiments, the method may include different and/or additional steps than those shown in FIG. 4. The functionality described in conjunction with the digital magazine server 140 in FIG. 4 may be provided by the recommendation engine 235, in one embodiment, or may be provided by any other suitable component, or components, in other embodiments. Additionally, the client device 130 may execute one or more instructions associated with the digital magazine server 140, such as an application associated with the digital magazine server 140, to provide the functionality described in conjunction with FIG. 4. For purposes of illustration, FIG. 4 describes recommendation of content based on inclusion of content items in a digital magazine; however, the steps described in conjunction with FIG. 4 may be used to recommend content based on inclusion of content items in any suitable collection of content. Example collections of content include: a feed of content items for presentation to a user, a selection of items made by a user (e.g., a shopping cart a user generates from an online retailer, a selection of desired items specified by a user), a selection of content items or items for presentation to a user, or other groups of content items associated with one or more users The digital magazine server 140 stores 405 information describing various digital magazines. A digital magazine is one or more content items each associated with one or more users and associated with a time when a content item was associated with the digital magazine. Examples of a digital magazine include a feed of content items for presentation to a user, a selection of items made by a user (e.g., a shopping cart a user generates from an online retailer, a selection of desired items specified by a user), a selection of content items or items for presentation or a user, or other groups of content items associated with one or more users.

In one embodiment, the digital magazine sever 140 stores 405 a digital magazine identifier corresponding to a digital magazine and associates one or more user identifiers with the digital magazine identifier to identify users of the digital magazine server 140 authorized to modify content items associated with the digital magazine. Content item identifiers are also associated with the digital magazine identifier to specify content items associated with the digital magazine. A content item identifier also includes information for retrieving a content item from a source 110, such as a network address of a content item, or includes information for retrieving the content item from the content store 215. Additionally, the digital magazine server 140 associates a timestamp with a content item identifier and a digital magazine identifier to indicate a time when a content item corresponding to the content item identifier was associated with a digital magazine corresponding to the digital magazine identifier. In various embodiments, digital magazine identifiers, content item identifiers, and associations between digital magazine identifiers and user identifiers are stored 405 in the content store 215.

Additionally, the digital magazine server 140 may associate one or more features with a content item identifier to identify features of a content item corresponding to the content item identifier. Example features of a content item include: a keyword, a topic, a category, an author, a fingerprint, or any other information capable of categorizing the content item. Different types of content items may be associated with different features. For example, if a content item is an article, features of an article may include one or more topics, one or more keywords, an author, or a source 110 of the article. As another example, if a content item is an advertisement, features of the advertisement may be one or more topics, one or more characteristics of a product or service associated with the advertisement, and an advertiser associated with the advertisement. In an additional example, if the content item is a product or service (e.g., items included in an online shopping cart or in a wish list) features of the content item may be a style, a type, a manufacturer, a provider, a retailer, a price, a product name, or other information about the product or service.

The digital magazine server 140 identifies 410 a user, also referred to as a "subject user," of the digital magazine server 140 that associated a content item with a subject digital magazine associated with the user. In various embodiments, the subject user is identified 410 based on interactions between the subject user and the digital magazine server 140. For example, the digital magazine server 140 identifies a user associating a content item with a digital magazine within a threshold amount of time from a current time. As another example, the digital magazine server 140 identifies a user performing at least a threshold number of interactions (e.g., associating a threshold number of content items with one or more digital magazines) with the digital magazine server 140 within a specified time interval. The digital magazine server 140 also identifies the digital magazine associated with the user, content item associated with the digital magazine by the user, and a timestamp associated with the content item associated with the digital magazine. For example, when a user associates a content item with a digital magazine, the digital magazine server 140 identifies 410 the user identifier of the user, the digital magazine identifier of the digital magazine, and the content item identifier of the content item associated with the digital magazine.

One or more additional digital magazines associated with additional users are identified 415 by the digital magazine server 140 after the digital magazine server 140 identifies 410 the subject user associating a content item with a subject digital magazine. In one embodiment, the digital magazine server 140 identifies 415 the subject digital magazine with which the user associated the content item and identifies one or more additional digital magazines, each associated with one or more additional users of the digital magazine server 140 and including the content item, but with which the content item was associated at a time before a time when the content item was associated with the subject digital magazine. The time when the content item was associated with the subject digital magazine is determined from a timestamp associated with the content item identifier and subject digital magazine identifier. For example, additional digital magazine identifiers where the content item identifier is associated with the additional digital magazine identifier and a timestamp specifying an earlier time than a timestamp associated with the content item identifier and with the subject digital magazine identifier are identified 415.

In some embodiments, rather than identify 415 the one or more additional digital magazines based on content items associated with the digital magazine and with various additional digital magazines, the digital magazine server 140 identifies 415 one or more additional digital magazines based on features of content items associated with the subject digital magazine. For example, the digital magazine server 140 identifies 415 one or more features of a content item associated with the subject digital magazine by the user and identifies 415 one or more additional digital magazines associated with a content item having at least a threshold number of features matching the features of the content item associated with the subject digital magazine by the subject user and associated with an additional digital magazine at a time before the subject user associated the content item with the subject digital magazine. As another example, the digital magazine server 140 identifies 415 one or more features of a content item associated with the subject digital magazine by the subject user and identifies 415 one or more additional digital magazines associated with a content item having at least a threshold number of features matching the features of the content item associated with the subject digital magazine by the subject user and associated with an additional digital magazine at a time after the subject user associated the content item with the subject digital magazine.

If the digital magazine server 140 identifies 415 one or more additional digital magazines with which a content item was associated at a time before the content item was associated with the subject digital magazine by the subject user, the digital magazine server 140 generates 420 a score for each of the identified additional digital magazines based at least in part on a number of content items associated with the additional digital magazine before the same content item was associated with the subject digital magazine. For example, the score is based on a number of content identifiers associated with the additional digital magazine that match a content identifier associated with the subject digital magazine and that are associated with a timestamp earlier than a timestamp associated with the same content item and with the subject digital magazine.

Alternatively, the score associated with an additional digital magazine is based at least in part on a number of content items associated with the additional digital magazine that have at least a threshold number of features matching features of a content item associated with the subject digital magazine and that were associated with the additional digital magazine before a content item having the threshold number of features was associated with the subject digital magazine. For example, a score of an additional digital magazine may be a number of content items associated with the additional digital magazine before the same content items were associated with the subject digital magazine, a number of content items associated with the additional digital magazine at times before a content item having at least a threshold number of features matching features of at least one of the content item were associated with the subject digital magazine, a percentage of content items associated with the additional digital magazine that match content items associated with the subject digital magazine and that were associated with the additional digital magazine at times before the content items were associated with the subject digital magazine, a percentage of content items associated with the additional digital magazine that have at least a threshold number of features matching features of a content item associated with the subject digital magazine and associated with the additional digital magazine before the matching content item was associated with the subject digital magazine. Hence, the score of an additional digital magazine provides a measure of similar content items associated with the subject digital magazine and associated with the additional digital magazine before the content items were associated with the subject digital magazine. The score may be stored in the content store 215 in association with an identifier of the digital magazine and an identifier of the additional digital magazine.

Based at least in part the scores associated with each of the additional magazines with which a content item was associated prior to the user associating the content item with the subject digital magazine, the digital magazine server 140 ranks 425 the additional digital magazines. For example, the ranking of additional digital magazines is proportional to the scores associated with additional digital magazines, so additional digital magazines associated with larger scores have higher positions in the ranking and additional digital magazines associated with lower scores have lower positions in the ranking. Additional information may be used to rank 425 the additional digital magazines. For example, a number of content items included in an additional digital magazine may be used to modify the additional digital magazine's position in the ranking, so a position of an additional digital magazine in the ranking may be increased if the additional digital magazine is associated with at least a threshold number of content items. As another example, an additional digital magazine's position in the ranking may be increased if the additional digital magazine is associated with an additional user to which the subject user has a connection.

One or more additional digital magazines are selected 430 based at least in part on the ranking. For example, additional digital magazines having at least a threshold position in the ranking or having the highest positions in the ranking are selected 430. In one embodiment, a number of additional digital magazines selected 430 is based at least in part on preferences specified by the subject user's user profile or based on a parameter specified by the digital magazine server 140. Alternatively, rather than rank 425 the additional digital magazines, the digital magazine server 140 selects 430 additional digital magazines with which a content item was associated prior the user associating the content item with the digital magazine having at least a threshold score.

Information associated with the selected one or more additional digital magazines is presented 435 to the subject user via a client device 130. In some embodiments, the presented information is a suggestion to the subject user that includes information identifying one or more of the selected additional digital magazines. For example, the digital magazine server 140 identifies a title and an additional user associated with a selected additional digital magazine and communicates the title and a description of the additional user to a client device 130 for presentation 435 by an application executing on the client device 130 and associated with the digital magazine server 140. Additionally, the presented information may identify the content item associated with the subject digital magazine by the user and also associated with the additional digital magazine before the subject user associated the content item with the subject digital magazine. Examples of presented information include a title of a selected additional digital magazine, one or more additional users associated with the selected additional magazine, or reasons for presenting the selected additional digital magazine to the subject user. Examples of reasons for presenting the selected additional digital magazine to the subject user include the score of the selected additional digital magazine, an indication of an amount of similarity between the selected additional digital magazine and the subject digital magazine (e.g., a value based on a number of content items associated with the selected additional digital magazine and associated with the subject digital magazine), and information describing content items associated with the subject digital magazine and associated with the selected additional digital magazine (e.g., topics, keywords, or authors associated with content items associated with the digital magazine and associated with the additional digital magazine).

By generating scores associated with additional digital magazines with which a content item was associated prior to the user associating the content item with the subject digital magazine and the digital magazine, the digital magazine server 140 may identify additional digital magazines in which the subject user is likely to have an interest. Additionally, identifying additional digital magazines with which a content item was associated prior to being associated with the subject digital magazine allows the digital magazine server 140 to identify additional digital magazines that may influence content items that the subject user associates with the subject digital magazine. Hence, the digital magazine server 140 may present 435 information about selected additional magazines to identify additional magazines to the subject user that are associated with content items that the subject user may subsequently associate with the subject digital magazine.

Additionally, if the digital magazine server 140 identifies 415 one or more additional digital magazines with which a content item was associated at a time after the content item was associated with the subject digital magazine by the subject user, the digital magazine server 140 generates 440 a score for each of the identified additional digital magazines based at least in part on a number of content items associated with the additional digital magazine after the same content items were associated with the subject digital magazine. For example, the score is based on a number of content identifiers associated with the additional digital magazine that match a content identifier associated with the subject digital magazine and having a timestamp associated with the additional digital magazine and the content identifier that is after a timestamp associated with the subject digital magazine and the content identifier.

Alternatively, the score associated with an additional digital magazine is based at least in part on a number of content items associated with the additional digital magazine that have at least a threshold number of features matching features of a content item associated with the digital magazine and were associated with the additional digital magazine after a content item having the threshold number of matching features was associated with the subject digital magazine. For example, a score of an additional digital magazine may be a number of content items associated with the additional digital magazine after the same content items were associated with the subject digital magazine, a number of content items associated with the additional digital magazine at times after a content item having at least a threshold number of features matching features of at least one of the content item were associated with the subject digital magazine, a percentage of content items associated with the additional digital magazine that match content items associated with the subject digital magazine and that were associated with the additional digital magazine at times after the content items were associated with the subject digital magazine, a percentage of content items associated with the additional digital magazine that have at least a threshold number of features matching features of a content item associated with the subject digital magazine and were associated with the additional digital magazine after the matching content item was associated with the subject digital magazine. Hence, the score of an additional digital magazine provides a measure of similar content items associated with the subject digital magazine and associated with the additional digital magazine after the content items were associated with the subject digital magazine One or more additional digital magazines with which a content item was associated after being associated with the subject digital magazine by the user are selected 445 based at least in part on the scores associated with the additional digital magazines. For example, additional digital magazines with which a content item was associated after being associated with the subject digital magazine by the user having at least a threshold score are selected 445. Because the additional digital magazines in this embodiment were associated with a content item after the user associated the content item with the subject digital magazine, the digital magazine server 140 may infer that content items added to the subject digital magazine have a threshold likelihood of subsequently being associated with the selected additional digital magazine.

In some embodiments, scores associated with multiple additional digital magazines associated with an additional user are combined to generate a score associated with the additional user. Further, scores associated with multiple additional digital magazines associated with an additional user and multiple subject digital magazines associated with the subject user may be generated 440 and combined to generate the score associated with the additional user. A score associated with an additional user may also be based in part on a frequency with which an additional user associates content items with additional magazines after the subject user associates the same content items with a digital magazine. Hence, a score associated with an additional user may provide an indication of a frequency with which the additional user associates content items with an additional digital magazine associated with the additional user after the subject user associates the content items with a subject digital magazine associated with the user. Additional users may be ranked based on their associated scores, with one or more of the additional users selected based on their associated scores. For example, the digital magazine server 140 ranks additional users based on their associated scores and selects additional users having at least a threshold position in the ranking. Because the selected additional users associate content items with one or more of their associated digital magazines after the subject user associated the content items with a subject digital magazine associated with the subject user, the digital magazine server 140 infers that content items associated with a subject digital magazine by the subject user influences content items associated with an additional digital magazine by a selected additional user. This allows the digital magazine server 140 to modify content items presented or recommended to the subject user to increase the likelihood of a selected additional user subsequently interacting with the content items presented or recommended to the subject user (e.g., that a selected additional user associates a content item with an additional digital magazine).

Additionally, the digital magazine server 140 may determine a target group of users based at least in part on scores generated for multiple additional users. For example, different target groups include additional users associated with different scores. Other information may be used to determine the target group of users. For example, a target group of users includes users having one or more characteristics matching characteristics of the subject user and having at least a threshold score. Different characteristics or threshold scores may be associated with different target groups.

In some embodiments, the digital magazine server 140 receives 450 a request from the subject user to present content to a target group of additional users. For example, the request identifies a content item and a target group to identify that users in the target group are eligible to be presented with the content item, while users not in the target group are ineligible to be presented with the content item. In one embodiment, the content item is an advertisement, allowing the subject user to target advertisements to different users based on the target groups including various users. In some embodiments, the request may be received from another entity authorized to access the scores associated with additional users, allowing the entity to leverage information about the influence of the subject user on the additional users when identifying content for presentation to the additional users.

The digital magazine server 140 may also store a suggestion identifying the subject user for presentation to a user in the target group of users. The suggestion identifying the subject user may also be communicated to a client device 130 for presentation to a user in the target group of users. For example, in the previous example, if the content item is an advertisement and the subject user is targeting the advertisement to users in the target group of users, a user in the target group of users may receive a suggestion identifying the subject user. The user in the target group of users may subsequently request to receive additional content from the subject user from the digital magazine server 140 based on the suggestion identifying the subject user.

In some embodiments, one or more features associated with content items are also used to identify content for presentation to an additional user. For example, a topic associated with a content item associated with the subject digital magazine before being associated with an additional digital magazine is determined along with an additional user associated with the additional digital magazine. The digital magazine server 140 may determine a number of times, or a frequency with which, the subject user associates content items associated with the topic with the digital magazine before the additional user associates content items associated with the topic with the additional digital magazine. If the determined frequency determined number of times is at least a threshold value, the request may identify one or more content items associated with the topic that the subject user associates with the digital magazine. In other embodiments, any suitable feature associated with a content item may be used (e.g., author, keyword, source 110, etc.).

Example Identification of Content for Recommendation

Figure 5A:
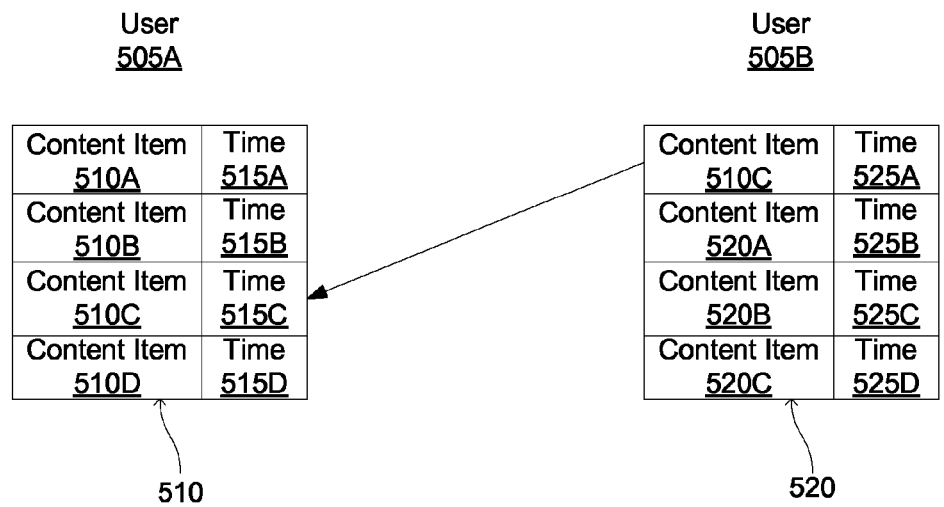
FIGS. 5A and 5B are examples of identifying content for presentation to a user of a digital magazine server based on content items associated with various digital magazines, in accordance with embodiments of the invention.

FIG. 5A is an example of identifying a digital magazine for recommendation to a user of the digital magazine server 140. In FIG. 5A, digital magazine 510 is associated with user 505A and digital magazine 520 is associated with user 505B. Digital magazine 510 includes content items 510A, 510B, 510C, 510D, which are associated with times 515A, 515B, 515C, 515D, respectively. Similarly, digital magazine 520 includes content items 510C, 520A, 520B, 520D, which are associated with times 525A, 525B, 525C, 525D, respectively. In this example, a time associated with a content item represents a time when the content item was associated with a digital magazine including the content item.

For purposes of illustration, time 525A is earlier than time 515C, so content item 510C was associated with digital magazine 520 before it was associated with digital magazine 510. If scores are generated for digital magazine 510 and digital magazine 520 based on a number of content items associated with digital magazine 510 and also associated with digital magazine 520, but associated with digital magazine 520 before being associated with digital magazine 510, digital magazine 520 has a score based on content item 510C. In the example of FIG. 5A, digital magazine 520 is identified as having at least a threshold score or at least a threshold position a ranking because of the score based on content item 510C. Hence, the digital magazine server 140 determines that digital magazine 520 affects the content included in digital magazine 520. Accordingly, information describing digital magazine 520 is presented to user 505A, allowing the user to establish a connection or otherwise identify content items associated with digital magazine 520. However, in other embodiments, the digital magazine server 140 may use other thresholds, so an increased number of content items are associated with digital magazine 520 before being associated with digital magazine 510 for digital magazine 520 to be identified to the user 505A.

Figure 5B:
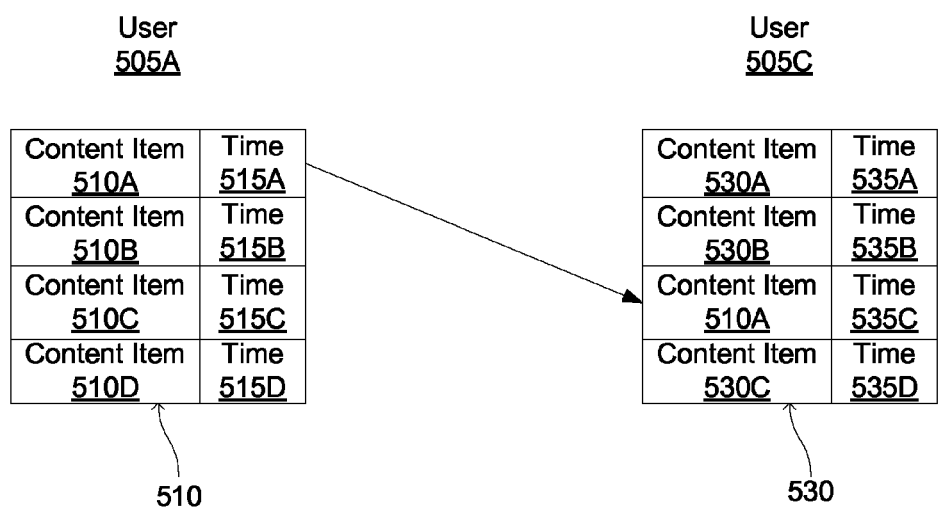

FIG. 5B is an example of identifying content for association with a digital magazine based on content items in an additional digital magazine. In FIG. 5B, digital magazine 510 is associated with user 505A and digital magazine 530 is associated with user 505C. Digital magazine 510 includes content items 510A, 510B, 510C, 510D, which are associated with times 515A, 515B, 515C, 515D, respectively. Similarly, digital magazine 530 includes content items 530A, 530B, 510A, 530C, which are associated with times 535A, 535B, 535C, 535D, respectively. As in FIG. 5A, a time associated with a content items represents a time when the content item was associated with a digital magazine including the content item.

For purposes of illustration, time 515A is earlier than time 535C, so content item 510A was associated with digital magazine 510 before it was associated with digital magazine 530. If scores are generated for digital magazine 510 and digital magazine 530 based on a number of content items associated with digital magazine 510 and also associated with digital magazine 530 after being associated with digital magazine 510, digital magazine 510 has a score based on content item 510A. In the example of FIG. 5B, digital magazine 510 is identified as having at least a threshold score or at least a threshold position a ranking because of the score based on content item 510A. Hence, the digital magazine server 140 determines that digital magazine 510 affects content included in digital magazine 530. Accordingly, information associated with digital magazine 510 or with user 505A is used to identify additional content items for recommendation to user 505C or for subsequent inclusion in digital magazine 530. However, in other embodiments, the digital magazine server 140 may use other threshold scores or positions in a ranking, so an increased number of content items are associated with digital magazine 510 before being associated with digital magazine 530 for characteristics of digital magazine 510 or user 505A to be used to identify content items for inclusion in digital magazine 530 or for presentation to user 505C.

Determining Influence of a Digital Magazine on Additional Digital Magazines

Figure 6:
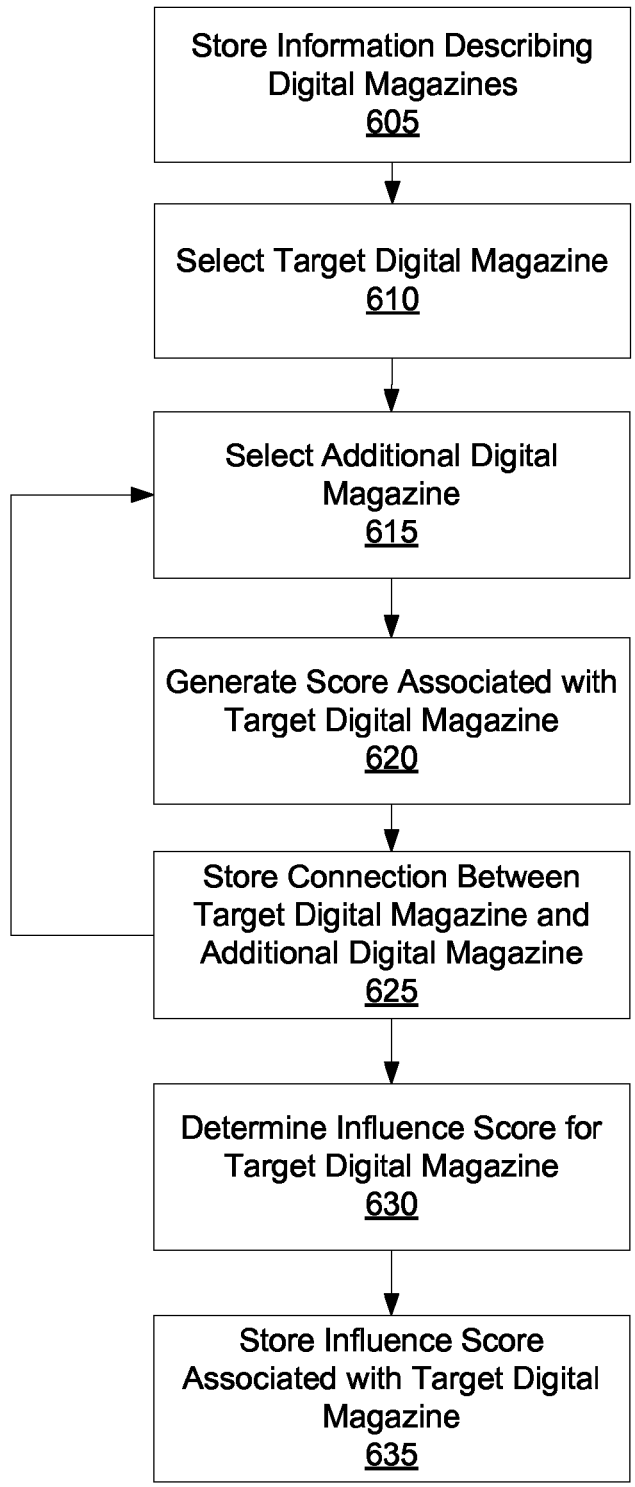
FIG. 6 is a flowchart of a method for determining influence of a digital magazine on content items associated with additional digital magazines, in accordance with an embodiment of the invention.

FIG. 6 is a flowchart of one embodiment of a method for determining influence of a digital magazine on content items associated with additional digital magazines. In other embodiments, the method may include different and/or additional steps than those shown in FIG. 6. The functionality described in conjunction with the digital magazine server 140 in FIG. 6 may be provided by the recommendation engine 235, in one embodiment, or may be provided by any other suitable component, or components, in other embodiments. Additionally, the client device 130 may execute one or more instructions associated with the digital magazine server 140, such as an application associated with the digital magazine server 140, to provide the functionality described in conjunction with FIG. 6.

As described above in conjunction with FIG. 4, the digital magazine server 140 stores 605 information describing various digital magazines. A digital magazine is one or more content items each associated with one or more users and associated with a time when a content item was associated with the digital magazine. Examples of a digital magazine include a feed of content items for presentation to a user, a selection of items made by a user (e.g., a shopping cart a user generates from an online retailer, a selection of desired items specified by a user), a selection of content items or items for presentation to a user, or other groups of content items associated with one or more users. For example, the digital magazine server 140 stores 605 a digital magazine identifier and an association between the digital magazine identifier and one or more user identifiers as well as an association with one or more content item identifiers. The user identifiers associated with the digital magazine identifier specify users of the digital magazine server 140 capable of modifying content items associated with the digital magazine, while the content item identifiers specify content items associated with the digital magazine. Additionally, a timestamp is associated with each content item identifier and digital magazine identifier combination to specify a time when a content item corresponding to a content item identifier was associated with a digital magazine corresponding to a digital magazine identifier, as described above in conjunction with FIG. 4.

The digital magazine server selects 610 a target digital magazine. In various embodiments, the target digital magazine may be selected 610 based on any suitable criteria. For example, the target digital magazine is selected 610 based on a time when a content item was associated with the target digital magazine, based on a time when the target digital magazine was created, an amount of interaction with the target digital magazine by users of the digital magazine server 140 (e.g., association of at least a threshold number of content items with the target digital magazine during a specified time interval, interaction with the target digital magazine by at least a threshold number of users within a specified time interval, etc.), or any other suitable information. Alternatively, the target digital magazine may be selected 610 by the digital magazine server 140 at random or based on any suitable function or criteria.

An additional digital magazine is selected 615 by the digital magazine server 140. The additional digital magazine may be selected 615 based on any suitable criteria, such as those described above, or may be selected 615 at random by the digital magazine server 140. Based at least in part on a number of content items associated with the target digital magazine and associated with the additional digital magazine after a time when the content items were associated with the target digital magazine, the digital magazine server 140 generates 620 a score associated with the target digital magazine. For example, the score associated with the target digital magazine is a number of content items associated with the target digital magazine and subsequently associated with the additional digital magazine, a percentage of content items associated with the target digital magazine that are also subsequently associated with the additional digital magazine, a number of content items associated with the target digital magazine having at least a threshold number of features that match features of a content item subsequently associated with the additional digital magazine, a percentage of content items associated with the target digital magazine that match content items subsequently associated with the additional digital magazine, a percentage of content items associated with the target digital magazine that have at least a threshold number of features matching features of a content item subsequently associated with the additional magazine, or any other suitable value. Hence, the score associated with the target digital magazine and the additional digital magazine provides a measure of the influence of associating content items with the target digital magazine on the content items being associated with the additional digital magazine.

The digital magazine server 140 stores 625 a connection between the target digital magazine and the additional digital magazine in the content store 215 that specifies the generated score. For example, the stored connection is information specifying an identifier associated with the target digital magazine, an identifier associated with the additional digital magazine, and the score generated for the target digital magazine. By storing 625 the score generated for the target digital magazine based on the additional digital magazine, the digital magazine server 140 maintains information describing the influence of associating a content item with the target digital magazine on subsequent association of the content item with the additional digital magazine.

In one embodiment, another additional digital magazine is selected 615, and a score for the target digital magazine based on a number of content items associated with the target digital magazine and associated with the other additional digital magazine is generated 620, as described above. The score generated 620 based on the target digital magazine and the other additional digital magazine is stored 625 along with an association between the target digital magazine and the other additional digital magazine. Multiple additional digital magazines may be selected 615 and scores associated with the target digital magazine generated 620 based on each of the additional digital magazines, allowing the digital magazine server 140 to maintain connections between the target digital magazine and various additional magazines describing an amount of influence associating a content item with the target digital magazine has on subsequent association of the content item with various additional digital magazines.

The digital magazine server may generate 620 a score for the target digital magazine based on each additional digital magazine stored by the digital magazine server 140, with the generated scores stored 625 by the digital magazine server 140 as described above. Alternatively, scores are generated 620 for the target digital magazine based on a specified number of additional digital magazines maintained by the digital magazine server 140, with the scores stored 625 by the digital magazine server 140 as connections between the target digital magazine and the various additional digital magazines. Generating 620 scores for a target digital magazine based on various additional digital magazines allows the digital magazine server 140 to maintain a graph of digital magazines, where a connection between the target digital magazine and an additional digital magazine represent an influence of the target digital magazine on content associated with the additional digital magazine.

Based on scores associated with the target digital magazine based on one or more additional digital magazines, the digital magazine server 140 determines 630 an influence score for the target digital magazine. For example, the digital magazine server 140 generates 620 multiple scores associated with the target digital magazine each based on a different additional digital magazine and determines 630 the influence score for the target digital magazine based on the stored scores associated with the target digital magazine. In various embodiments, the influence score for the target digital magazine is determined 630 by combining stored scores associated with the target digital magazine.

In some embodiments, influence scores associated with additional digital magazines connected to the target digital magazine affect the influence score determined 620 for the target digital magazine. For example, the influence score of the target digital magazine is determined 620 based at least in part on influence scores associated with each additional digital magazine connected to the target digital magazine and a number of digital magazines connected to each additional digital magazine connected to the target digital magazine. In one embodiment, an influence score for the target digital magazine is based on a set of content items associated with the target digital magazine and also associated with an additional digital magazine, so influence scores for the additional digital magazine and other digital magazines based on the set of content items affect the influence score for the target digital magazine. Influence scores for the other digital magazines and digital magazines based on the set of content items may also be factors in determining 630 the influence score for the target digital magazine. The relative amount of contribution of an influence score of a digital magazine to the influence score of the target digital magazine may be based a number of intermediate digital magazines connected directly or indirectly to the target digital magazine before a connection the digital magazine. Additionally, a number of additional digital magazines including content items included in the target digital magazine may modify the influence score of the target digital magazine.

The digital magazine server 140 stores 635 the determined influence score in association with the target digital magazine. An influence score associated with a digital magazine may affect content items recommended to a user associated with the digital magazine, advertisements presented via the digital magazine, or other selections of data for presentation via the digital magazine. For example, if a digital magazine is associated with at least a threshold influence score, content items may be identified as recommendations for inclusion in the digital magazine to increase the likelihood of additional users associating the content items with additional digital magazines, increasing the distribution of the content items to digital magazine server users. As another example, an influence score associated with a digital magazine is used as a factor for selecting advertisements for presentation via the digital magazine; for example, the digital magazine server 140 ranks advertisements based in part on bid amounts associated with the advertisements and modifies the ranking of various advertisements based at least in part on the influence score associated with the digital magazine in which one or more advertisements are to be presented.

In some embodiments, the digital magazine server 140 identifies a user associated with the target digital magazine and identifies other digital magazines associated with the user. Based on the influence score of the target digital magazine and influence scores associated with other digital magazines associated with the user, the digital magazine server 140 may generate a user score, which provides a measure of the influence of the user's association of content items with digital magazines associated with the user on subsequent association of one or more of the content items with digital magazines by additional users of the digital magazine server 140. For example, a user score is based on a sum of the influence scores of each digital magazine associated with the user or based on a sum of influence scores of each magazine in a set of digital magazines associated with the user. In one embodiment, the digital magazine server 140 ranks various users based on their associated user scores and uses the ranking when determining content items or applications to recommend to a user. For example, certain content items or applications are recommended to a user with at least a threshold user score to increase the likelihood of additional users interacting with the content items or applications if a user with at least a threshold user score interacts with the content items or applications. User scores may similarly be used when selecting advertisements to a user, as advertisements presented to users with at least a threshold user score may have an increased likelihood of receiving interactions from additional users that are influenced by a user with the threshold user score.

In some embodiments, the scores generated 620 for the target digital magazine may be based on content items having one or more specific features that were associated with the target digital magazine before being associated with an additional digital magazine. For example, the score is generated 620 based on a number of content items having a specific topic, keyword, or author associated with the target digital magazine before being associated with an additional digital magazine. As described above, scores generated based on the target digital magazine and various additional digital magazines are used to determine 630 an influence score for the target digital magazine. However, because the scores were generated 620 based on content items having one or more specific features, the determined influence score indicates the target digital magazine's influence over association of content items having the one or more specific features in additional digital magazines.

Figure 7:
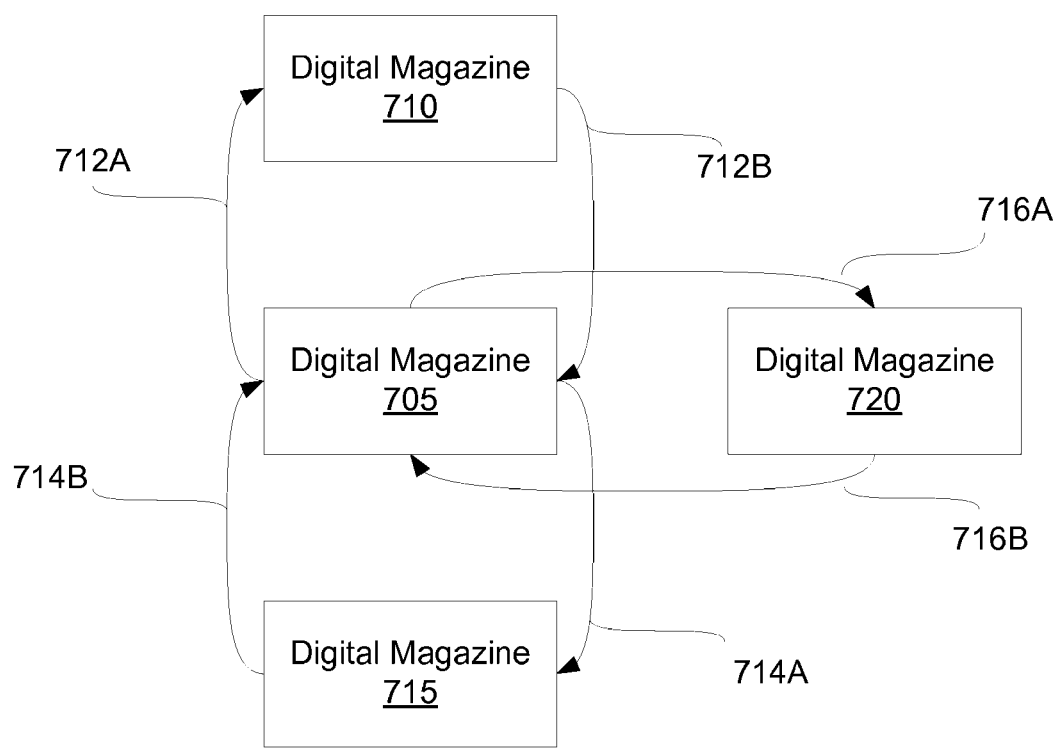
FIG. 7 is an example of information describing influence of a digital magazine on additional digital magazines, in accordance with an embodiment of the invention.

FIG. 7 is an example of information stored by the digital magazine server 140 identifying influence of digital magazines on additional digital magazines. In FIG. 7, digital magazines 705, 710, 715, 720 are stored by the digital magazine server 140. As described above in conjunction with FIG. 6, an influence score for various digital magazines is determined. For clarity, FIG. 7 shows influence scores based on digital magazine 705. As shown in FIG. 7, each digital magazine or other collection of content is associated with a node in a graph, with connections between a pair of nodes having a direction based on which node in the pair of nodes a content item was first associated.

Connections between pairs of digital magazines describe an amount of influence of one digital magazine in the pair on the other digital magazine in the pair. For example, connection 712A includes an influence score describing an amount of influence of digital magazine 705 on digital magazine 710, while connection 712B includes an influence score describing an amount of influence of digital magazine 710 on digital magazine 705. Similarly, connection 714A is associated with an influence score describing an amount of influence on digital magazine 715 by digital magazine 705, and connection 716A is associated with an influence score describing an amount of influence on digital magazine 720 by digital magazine 705. An influence score associated with connection 714B indicates an amount of influence on digital magazine 705 by digital magazine 715, while an influence score associated with connection 716B describes an amount of influence on digital magazine 705 by digital magazine 720. Accounting for the influence score associated with a connection between digital magazines allows the digital magazine server 140 to determine a value describing an influence of a digital magazine on various digital magazines maintained by the digital magazine server 140.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing information describing a plurality of digital magazines in a digital magazine server, each digital magazine including one or more content items and timestamps indicating times when each content item was added to the digital magazine;
identifying a user of the digital magazine server that associated a content item with a subject digital magazine associated with the user;
identifying one or more additional digital magazines with which the content item was associated before the user associated the content item with the subject digital magazine;
generating a score for each additional digital magazine, the score for an additional digital magazine based on a number of times that content items were added to the additional digital magazine before the same content items were added to the subject digital magazine;
ranking the additional digital magazines based at least in part on the scores;
selecting one or more of the additional digital magazines based at least in part on the ranking; and
presenting a suggestion identifying the selected one or more additional digital magazines to the user.

2. The method of claim 1, wherein the score for an additional digital magazine is based at least in part on a number of content items associated with the subject digital magazine and a number of content items associated with the additional digital magazine.

3. The method of claim 2, wherein a content item associated with the subject digital magazine and associated with an additional digital magazine comprises a content item associated with a content identifier that is associated with the subject digital magazine and is also associated with the additional digital magazine.

4. The method of claim 1, wherein the score for the additional digital magazine is based at least in part on a number of content items associated with the additional digital magazine having at least a threshold number of features matching features of at least one content item associated with the subject digital magazine.

5. The method of claim 4, wherein a feature is selected from a group consisting of: a keyword, a topic, a category, an author, a fingerprint, a type, a style, a manufacturer, a source, and any combination thereof.

6. The method of claim 1, wherein the score for the additional digital magazine is based at least in part on a percentage of content items that were associated with the additional digital magazine before being added to the subject digital magazine.

7. The method of claim 1, wherein the score for the additional digital magazine is based at least in part on a percentage of content items associated with the additional digital magazine before they were associated with the subject digital magazine and having at least a threshold number of features matching features of at least one content item associated with the subject digital magazine.

8. The method of claim 1, wherein the ranking of the additional digital magazines is further based at least in part on a number of content items included in each of the additional digital magazines.

9. The method of claim 1, wherein the ranking of the additional digital magazines is further based at least in part on connections between the user and additional users associated with each of the additional digital magazines.

10. The method of claim 1, wherein a suggestion identifying a selected additional digital magazine is selected from a group consisting of: a title of the selected additional digital magazine, a description of an additional user associated with the selected additional digital magazine, a score associated with the selected additional digital magazine, an indication of a level of similarity between the selected additional digital magazine and the digital magazine, information describing content items associated with the selected additional digital magazine, and any combination thereof.

11. A method comprising:
storing information describing a plurality of collections of content, each collection including one or more content items and timestamps indicating times when each content item was added to a collection;
identifying a user of a content server that associated a content item with a subject collection of content associated with the user;
identifying one or more additional collections of content with which the content item was associated before the user associated the content item with the subject collection;
generating a score for each additional collection, the score for an additional collection based on a number of times that content items were added to the additional collection before the same content items were added to the subject collection;
ranking the additional collections based at least in part on the scores;
selecting one or more of the additional collections based at least in part on the ranking; and
presenting information identifying the selected one or more additional collections to the user.

12. The method of claim 11, wherein the score for an additional collection is based at least in part on a number of content items associated with the subject collection and a number of content items associated with the additional collection.

13. The method of claim 12, wherein a content item associated with the subject collection and associated with an additional collection comprises a content item associated with a content identifier that is associated with the subject collection and is also associated with the additional collection.

14. The method of claim 11, wherein the score for the additional collection is based at least in part on a number of content items associated with the additional collection having at least a threshold number of features matching features of at least one content item associated with the subject collection.

15. The method of claim 14, wherein a feature is selected from a group consisting of: a keyword, a topic, a category, an author, a fingerprint, a type, a style, a manufacturer, a source, and any combination thereof.

16. The method of claim 11, wherein the ranking of the additional collections is further based at least in part on a number of content items included in each of the additional collections.

17. The method of claim 11, wherein the ranking of the additional collections is further based at least in part on connections between the user and additional users associated with each of the additional collections.

18. The method of claim 11, wherein information identifying a selected additional collection is selected from a group consisting of: a title of the selected additional collection, a description of an additional user associated with the selected additional collection, a score associated with the selected additional collection, an indication of a level of similarity between the selected additional collection and the collection, information describing content items associated with the selected additional collection, and any combination thereof.

19. The method of claim 11, wherein the subject collection is selected from a group consisting of: a feed of content items for presentation to the user, a selection of items made by the user, a selection of content items for the user, and any combination thereof.

20. A computer program product comprising a computer-readable storage medium having instructions encoded thereon that, when executed by a processor, cause the processor to:
store information describing a plurality of collections of content, each collection including one or more content items and timestamps indicating times when each content item was added to a collection;
identify a user of a content server that associated a content item with a subject collection of content associated with the user;
identify one or more additional collections of content with which the content item was associated before the user associated the content item with the subject collection;
generate a score for each additional collection, the score for an additional collection based on a number of times that content items were added to the additional collection before the same content items were added to the subject collection;
rank the additional collections based at least in part on the scores;
select one or more of the additional collections based at least in part on the ranking; and
present information identifying the selected one or more additional collections to the user.

* * * * *